United States Patent [19]

Ruoss

[11] Patent Number: 4,831,487

[45] Date of Patent: May 16, 1989

[54] REACTOR SWITCH ARC-BACK LIMITING CIRCUIT

[75] Inventor: Erich Ruoss, Untersiggenthal, Switzerland

[73] Assignee: BBC Brown, Boveri & Co., Ltd., Switzerland

[21] Appl. No.: 73,377

[22] Filed: Jul. 14, 1987

Related U.S. Application Data

[63] Continuation of Ser. No. 795,091, Nov. 5, 1985, abandoned.

[30] Foreign Application Priority Data

Nov. 12, 1984 [CH] Switzerland ........................ 5401/84

[51] Int. Cl.[4] ................................................ H02H 3/20

[52] U.S. Cl. ........................................ 361/111; 361/91

[58] Field of Search ..................................... 361/3–13, 361/2, 54, 56, 58, 111, 91, 35; 200/144 R, 144 AP

[56] References Cited

U.S. PATENT DOCUMENTS

| | | | |
|---|---|---|---|
| 2,729,721 | 1/1956 | Forwald | 361/8 X |
| 3,543,047 | 11/1970 | Renfrew | 361/13 X |
| 3,737,724 | 6/1973 | Salge et al. | 361/8 |
| 3,891,813 | 6/1975 | Yoon et al. | 361/8 X |
| 3,995,198 | 11/1976 | Kriechbaum | 361/3 |
| 4,005,340 | 1/1977 | Härtel | 361/8 X |
| 4,172,268 | 10/1979 | Yanabu et al. | 361/6 X |
| 4,209,814 | 6/1980 | Garzon | 361/8 X |
| 4,250,531 | 2/1981 | Ahrens | 361/2 |
| 4,300,181 | 11/1981 | Premerlani | 361/8 X |
| 4,307,428 | 12/1981 | Yanabu et al. | 361/3 X |
| 4,459,629 | 7/1984 | Titus | 361/8 X |
| 4,550,356 | 10/1985 | Takahashi | 361/13 X |
| 4,578,730 | 3/1986 | Tokuyama et al. | 361/8 X |
| 4,583,146 | 4/1986 | Howell | 361/13 |
| 4,618,905 | 10/1986 | Tokuyama et al. | 361/13 X |
| 4,623,948 | 11/1986 | Volut | 361/8 X |
| 4,700,256 | 10/1987 | Howell | 361/8 X |

FOREIGN PATENT DOCUMENTS

| | | | |
|---|---|---|---|
| 1291403 | 3/1969 | Fed. Rep. of Germany | 361/8 |
| 2421885 | 11/1975 | Fed. Rep. of Germany | 361/8 |

*Primary Examiner*—M. H. Paschall
*Assistant Examiner*—A. Jonathan Wysocki
*Attorney, Agent, or Firm*—Ostrolenk, Faber, Gerb & Soffen

[57] ABSTRACT

A reactor switch has a switching point which is arranged between a high-voltage reactor and a high-voltage line. When this switch is being switched off, the occurrence of arc-back oscillations with excessively high rate voltage changes is avoided in a simple and reliable manner. This is achieved in that the switching point is connected in parallel with a voltage-dependent resistor. This resistor, which preferably contains a metal oxide such as zinc oxide, has a current/voltage characteristic which limits the recurring voltage across the switching point in such a manner that the skewing rate of the voltage of a high-frequency arc-back oscillation occurring during an arc-back of the switching point always remains below a predetermined value.

5 Claims, 3 Drawing Sheets

REACTOR SWITCH ARC-BACK LIMITING CIRCUIT

This is a continuation of application Ser. No. 795,091, filed on Nov. 5, 1985, now abandoned.

BACKGROUND & SUMMARY OF THE INVENTION

The present invention is directed a reactor switch.

The invention relates to reactor switches of the type described by G. Köppl and E. Ruoss in the paper "Schaltüberspannungen in Hoch- und Höchstspannungsnetzen" ("Switch-over voltages in high and super-high voltage systems"), published in Brown Boveri Mitt. 1970, p. 554 ff. When the switching point of the prior art reactor switch is opened, an oscillating voltage can occur as a recurring voltage as a result of the inductance and the capacitance of the reactor when the current breaks off and before its natural zero transition. The amplitude of the voltage can be limited by damping resistors placed in parallel with the switching point, if necessary. If during the opening process, the contacts of the switching points separate only shortly before the zero transition of the current, an arc can develop between the switch contacts. If this arc is coupled with a sufficiently high oscillating voltage amplitude, arc oscillations with very rapid voltage changes can additionally occur at the reactor. This poses a risk of damage to the insulation 4' (symbolically illustrated of the reactor 4 (FIG. 1).

The present invention provides a reactor switch of the generic type in which arc-back oscillations with excessively high voltage changes are avoided in a simple and reliable manner.

The reactor switch according to the invention is characterised by the fact that steep slopes of high-frequency arc-back oscillations, possibly occurring at the reactor, are limited with comparatively low energy absorption. Insulation damage at the reactor can thus be avoided even with resistors which are dimensioned only for absorbing small quantities of energy. In addition this switch can be used for carrying out a large number of switching actions within a very short time without problems.

German Offenlegungsschrift No. 3,038,516 teaches to arrange voltage-dependent resistors in parallel with a switching path to provide for optimum switching of transformers. But, another switching path, which has connected in parallel therewith a resistor and an auxiliary switching path, is provided between this switching path and the transformer. However, such an arrangement is rather elaborate since it requires two switching paths with different circuits.

In addition, F. Parschalk, in his paper "Hochstspannungs-Druckluftschnellschalter grosser Ausschaltleistungen fur Schwerpunkte des Verbundbetriebes" ("Super-high voltage compressed-air high-speed switches for large breaking capacities for focal points in the compound-system operation"), BBC-Nachrichten, volume 41 (1959), page 328, describes a switch in which a series circuit of an auxiliary switching chamber and a voltage-dependent resistor is located in parallel with a quenching contact. This resistor is in parallel with the quenching contact only during the very brief breaking process which achieves ideal potential control and thus optimum breaking performance.

Properties and advantages of the invention are explained below in greater detail in relation to non-limiting embodiments which are shown in the drawings.

DETAILED DESCRIPTION

Figure 1:
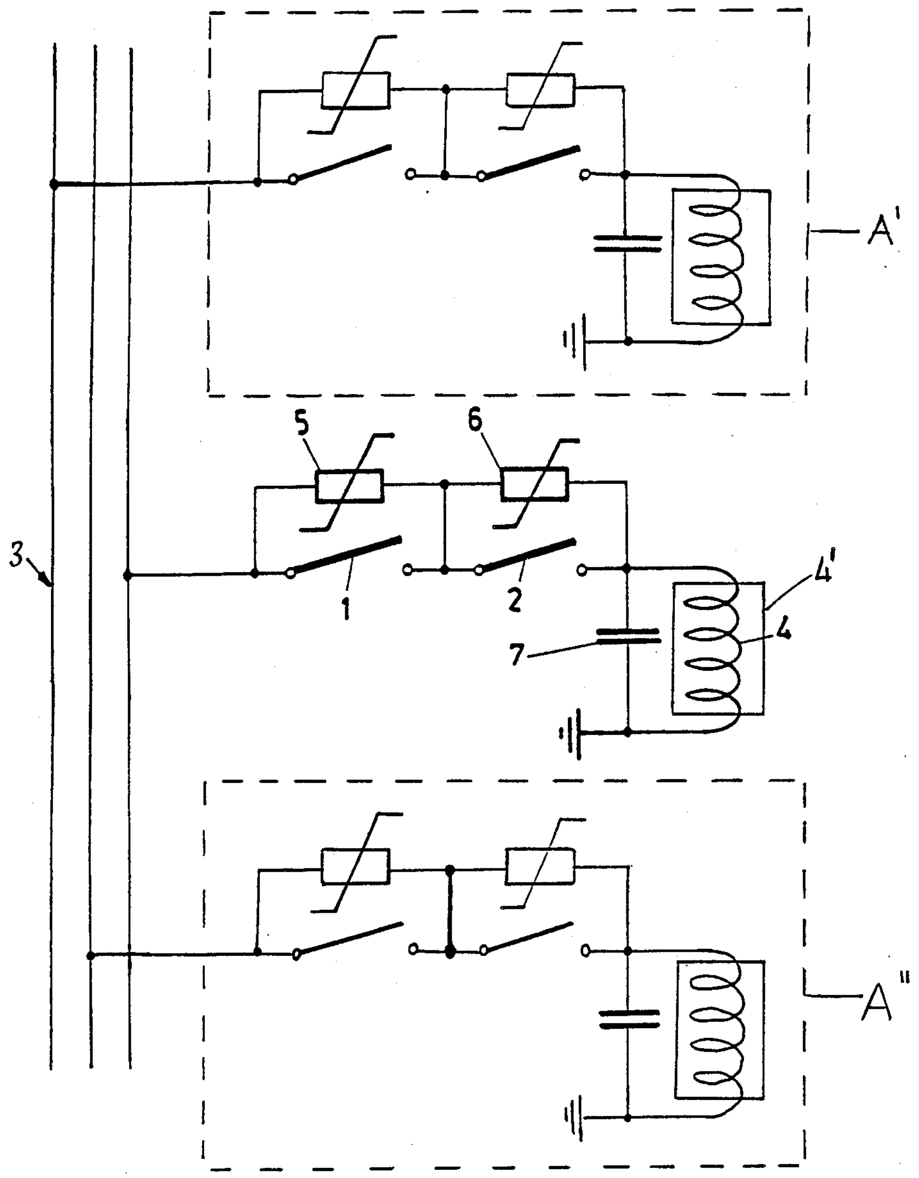
FIG. 1 shows a circuit diagram comprising a reactor switch constructed in accordance with the invention.

In FIG. 1, two series-connected switching points 1 and 2 of a reactor switch are arranged between one phase of a high-voltage line 3 and a reactor 4. In parallel with each of the two switching points 1 and 2, voltage-dependent resistor 5 and 6, is connected. Resistors 5 and 6 are preferably zinc oxide based metal oxide resistors but can also be any other voltage-dependent resistor which has a highly non linear current/voltage characteristic, the nonlinearity of which is much higher than that of silicon carbide resistors. Capacitance 7 is in parallel with reactor 4. Essentially it represents the inherent capacitance of reactor 4. The dotted boxes A' and A" repeat the above circuit for the other phases of the high voltage line 3.

Figure 2:
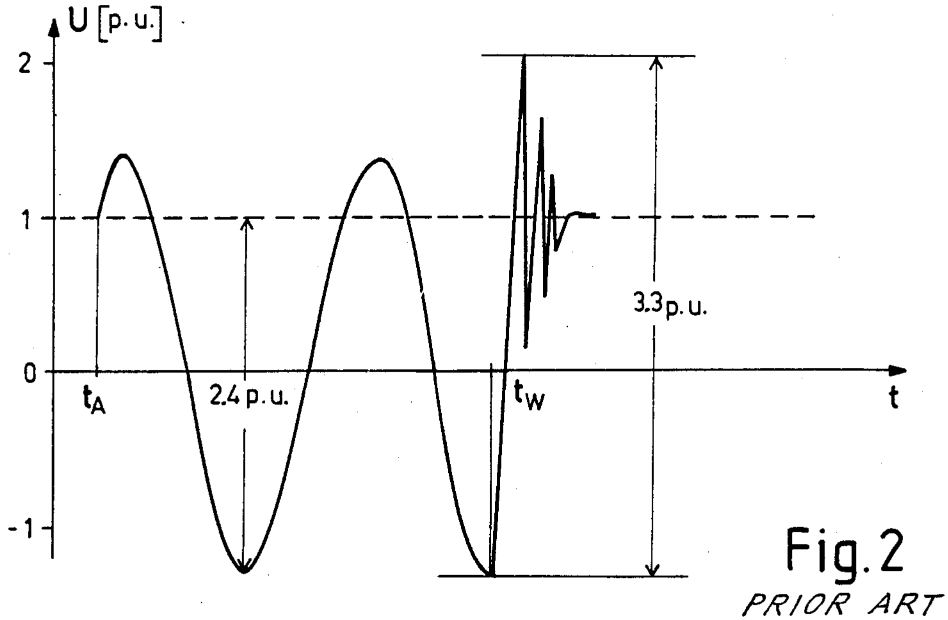
Fig. 2 PRIOR ART
FIG. 2 shows a graphic representation of the variation with time of the voltage acting across the reactor during the switching off of a known reactor switch.
Figure 3:
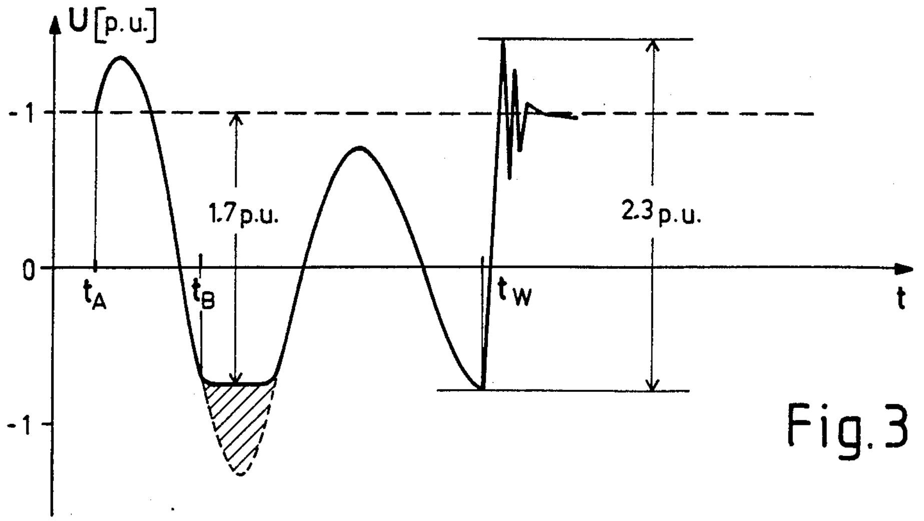
FIG. 3 shows a graphic representation of the variation with time of the voltage acting across the reactor during the switching off of a reactor switch according to the invention.
Figure 4:
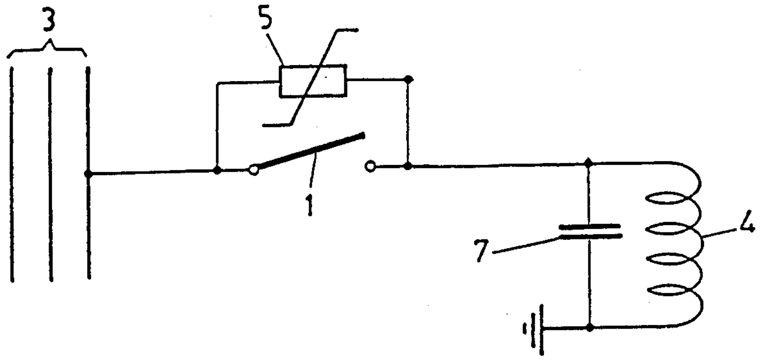
FIG. 4 illustrates a second embodiment.
Figure 5:
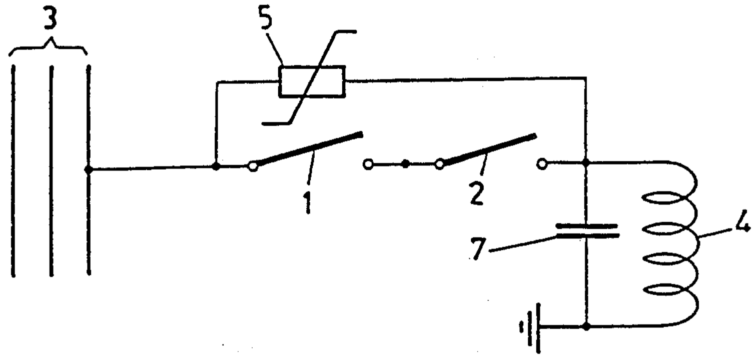
FIG. 5 illustrates a third embodiment.

The operation of the reactor switch according to the invention is explained in greater detail with the aid of FIGS. 2 and 3.

During the switching-off process, switching paths 1 and 2 are opened and the current flowing in reactor 4 is interrupted at time $t_A$ before it reaches its natural zero transistion. The breaking of the current leads to an over voltage which oscillates around zero at the characteristic frequency of reactor 4 or around an operating-frequency voltage of opposite polarity at the characteristic frequency of reactor 4. As is well known to the skilled artisan, this frequency depends on the inherent inductance and capacitance of the reactor. Usually, and by way of example, the frequency will be 2, 5 or maybe 10 kHz. Across switching points 1 and 2, the difference between the system voltage and this oscillating voltage appears as a so-called recurring voltage U.

The variation of the recurring voltage is shown in FIGS. 2 and 3 in per-units (noramlized values), in which one per-unit (p.u.) is set to be equal to $\sqrt{2}/\sqrt{3}$ times the peak value of one phase of the system voltage of the high-voltage line 3. The variation of the system voltage at the voltage maximum is shown by the dashed area in FIG. 3. This maximum is almost constant over the time intervals specified in these Figures since the maximum amplitude of the system voltage virtually does not change during the time intervals represented in FIGS. 2 and 3.

FIG. 2 shows the maximum peak value of the recurring voltage across the switching points in a reactor switch according to the prior art. This peak value reaches a 2.4 p.u. value since the peak value of 1.4 p.u. of the oscillating reactor voltage is added to the 1 p.u. system voltage at the maximum voltage.

However, it is possible that the contacts separate shortly before the zero transition of the current, for example, 1 or 2 ms before. Consequently, the contacts will have formed only a small insulating distance and an arc can occur in the known reactor switch. In the Figures, the forming arc period is called $t_W$. At this time, the voltage of the reactor swings back with a high frequency with an overshoot to the instantaneous value of the system voltage. This overshoot is accompanied with a very steep voltage change across reactor 4. In the example specified in FIG. 2, an arc-back oscillation of 500 kHz with an amplitude of 3.3 p.u. occurs immediately after the arc back. This arc-back oscillation has a slope of 3.3 p.u./μs. As a result, the insulation of the reactor can be overstressed considerably in local areas.

In the reactor switch according to the present invention, voltage-dependent resistors 5 and 6 have the effect that the voltage recurring across the switching points 1 and 2 after the current break at time $t_A$ is limited in such a manner that the rate of change of the high-frequency arc-back oscillation occurring at the reactor during an arc-back of these switching points are limited to below a predetermined limit value. It has been found to be particularly advantageous to make this limit value about 2.4 p.u./μs since there are many reactors which are incapable of sustaining voltage changes which are steeper than 2.4 p.u./μs.

Variable resistors 5 and 6, which are preferably constructed as zinc oxide based metal oxide resistors, are in this arrangement dimensioned in such a manner that they have a very large resistance value below 1.2 to 1.7 p.u. Above a limit voltage, of about 1.7 p.u., see the illustrative embodiment of FIG. 3, its resistance value becomes almost negligible so that no significant increase occurs in the recurring voltage above the predetermined limit voltage after the time, designated $t_B$ in FIG. 3, when the voltage-dependent resistors 5 and 6 become conductive.

If the reactor switch arcs again at time $t_W$, the initial amplitude of the high-frequency arc-back oscillation occurring as a result of this arc-back will reach only 2.3 p.u. at a maximum. At 500 kHz, this corresponds to a voltage change of 2.3 p.u./μs, below 2.4 p.u./μs, a voltage rate of change limited value which is still unharmful for most reactors.

If the value of the recurring voltage, at which the voltage-dependent resistors become conductive, and thus also the associated limit value of the steepness of the voltage change of the high-frequency arc-back oscillation is made high, voltage-dependent resistors 5 and 6 have to absorb comparatively little energy (hatched area in FIG. 3).

If high voltages are being switched, it is occasionally advantageous, from the perspective of good voltage distribution across the reactor switch, to place a voltage-dependent resistor in each case parallel to one of several switching points in each case. With respect to a simple structural construction of the reactor switch according to the invention, for example if two of its switching points are arranged to be V-shaped, it is possibly useful to place a voltage-dependent resistor in parallel with at least two series-connected switching points.

I claim:

1. An electrical network, comprising:

a three-phase electrical system having three-phase lines energized with a predetermined system high-voltage and coupled to each line a respective circuit including:

a high-voltage reactor having a natural capacitance and a natural inductance which enable the high-voltage reactor to oscillate with a first over-voltage having a frequency of several kHz after said reactor is disconnected from a respective one of said three-phase lines;

a reactor switch disposed between said high-voltage reactor and said respective line for selectively connecting and disconnecting said high-voltage reactor from said respective line, said reactor switching including a first terminal electrically connected to said high-voltage line and a second terminal electrically connected to said high-voltage reactor, said reactor switch further including a first switching unit connected between said first and second terminals of said reactor switch, said reactor switch inducing, between said first and second terminals and during the opening thereof, a recovery voltage corresponding to the difference between said system high-voltage and said first over-voltage;

said electrical network being of the type in which reignition of said reactor switch induces a second over-voltage including a high-frequency restrike oscillation having a frequency on the order of several hundred kHz, said high-voltage reactor being susceptible to being damaged on being exposed to said second over-voltage as a result of excessive rate of change in voltage associated with said second over-voltage; and a first voltage-dependent resistor connected in parallel across said reactor switch, said first voltage-dependent resistor comprising at least one metal oxide, having a current-voltage characteristic rate to limit the recovery voltage across said reactor switch below a first predetermined value to keep the rate of change of voltage of the second over-voltage below a second predetermined limiting value, said first predetermined value being substantially larger than said predetermined system high voltage and said first voltage-dependent resistor being essentially connected across said reactor switch and tailored for the purpose of keeping said rate of change of voltage of said second over-voltage below said second predetermined limiting value.

2. The electrical network of claim 1, in which the reactor includes insulation means for insulating the reactor and wherein it is the insulation means which is susceptible to being damaged by the high-frequency restrike oscillation component.

3. The electrical network of claim 2, further comprising a second switching unit connected in series with said first switching unit and in parallel with said voltage-dependent resistor.

4. The electrical network of claim 2, in which said reactor switch comprises a second switching unit and a second voltage-dependent resistor connected in parallel to one another, said second switching unit and said second voltage-dependent resistor being further connected in series with said first switching unit and first voltage-dependent unit and between said first and second terminals of said reactor switch.

5. The electrical network of claims 1, 2, 3 or 4, in which said predetermined value equals 2.4 normalized voltage units per microsecond where one normalized unit is equal to $\sqrt{2}/\sqrt{3}$-times a peak value of one phase voltage associated with said electrical network.

* * * * *